(12) United States Patent
Huang

(10) Patent No.: US 6,415,662 B1
(45) Date of Patent: Jul. 9, 2002

(54) SHELL STRUCTURE FOR SIGNAL SENSING AND TRANSMITTING DEVICE

(76) Inventor: Chun-Mu Huang, 6 Fl., No. 60-5, Jengyi S. Rd., Sanchung City, Taipei (TW), 241

(*) Notice: Subject to any disclaimer, the term of this patent is extended or adjusted under 35 U.S.C. 154(b) by 0 days.

(21) Appl. No.: 09/455,590

(22) Filed: Dec. 6, 1999

(30) Foreign Application Priority Data

Mar. 31, 1999 (TW) ...................................... 88204949 U

(51) Int. Cl.$^7$ .............................. G01P 1/02; G01P 21/02

(52) U.S. Cl. ............................. 73/493; 73/431; 324/171

(58) Field of Search .................... 73/493, 494, 431; 324/166, 171, 160

(56) References Cited

U.S. PATENT DOCUMENTS 4,334,190 A * 6/1982 Sochaczevski ............... 324/171
5,481,901 A * 1/1996 Huang .......................... 73/493

FOREIGN PATENT DOCUMENTS

DE 446689 * 7/1986 ................... 235/97

* cited by examiner

Primary Examiner—Helen Kwok
(74) Attorney, Agent, or Firm—Klein & Szekeres LLP

(57) ABSTRACT

A shell structure of a signal sensing and transmitting device adapted to be used with a wireless speedometer for a bicycle is provided. A main body of a signal sensing and transmitting circuit and a battery is received within the shell structure. The shell structure includes a shell body including an opening for being inserted therethrough the main body of the signal sensing and transmitting circuit and the battery, and a receiving space for receiving therein the main body of the signal sensing and transmitting circuit and the battery; and a fastening lip for covering the opening of the shell body and fastening the main body of the signal sensing and transmitting circuit and the battery within the shell body.

15 Claims, 8 Drawing Sheets

SHELL STRUCTURE FOR SIGNAL SENSING AND TRANSMITTING DEVICE

FIELD OF THE INVENTION

The present invention relates to a shell structure, and more particularly to a shell structure for a signal sensing and transmitting device.

BACKGROUND OF THE INVENTION

The bicycle is considered as a transporting device as well as an entertainment tool in leisure time. A wireless speedometer for a bicycle is developed and becomes popular. Such a speedometer can provide information including the speed of the bicycle, the distance that the bicycle has moved, etc. Referring to FIG. 1, a wireless speedometer 1 is mounted on a bicycle 10. The wireless speedometer 1 includes a magnet 11, a signal sensing and transmitting device 13, and a calculating and indicating device 15. The magnet 11 is mounted on a spoke 12 of the bicycle 10. The signal sensing and transmitting device 13 is mounted on the folk 16 of the bicycle 10. The signal sensing and transmitting device 13 includes a reed switch (not shown). The position of the signal sensing and transmitting device 13 is corresponding to that of the magnet 11 so that the magnet 11 can pass through the signal sensing and transmitting device 13 while the bicycle 10 is moving. When the magnet 11 passes through the signal sensing and transmitting device 13, an on/off signal will be generated by the reed switch. A control signal is then generated and transmitted by the signal sensing and transmitting device 13 to the calculating and indicating device 15 mounted on the handlebar 14. The calculating and indicating device 15 includes a microprocessor and a liquid crystal display (not shown). According to the number and the frequency of the received control signals and the diameter of the front wheel 17 of the bicycle 10, the speed and the moving distance of the bicycle 10 can be calculated by the microprocessor and indicated on the liquid crystal display.

FIGS. 2(a) and 2(b) respectively illustrate two kinds of conventional signal sensing and transmitting devices. In FIG. 2(a), the conventional signal sensing and transmitting device includes the main body of the signal sensing and transmitting circuit 21, and the battery 22. The main body of the signal sensing and transmitting circuit is received within the shell body 231. The shell cover 232 is mounted to the shell body after the main body of the signal sensing and transmitting circuit 21 has been put into the shell body 231. The shell cover 232 is fastened on the shell body by the screws 24. A water-resistant ring 235 is mounted between the shell cover 232 and the shell body 231 to keep the circuit away from moisture. The shell cover 232 includes a battery hole 233 for receiving therein the battery 22. The battery 22 is fastened by the battery cover 234. To keep the battery 22 away from moisture, a water-resistant ring 236 is mounted between the battery cover 234 and the shell cover 232.

In FIG. 2(b), the conventional signal sensing and transmitting device include the main body of the signal sensing and transmitting circuit 71 and the battery 72. The assembly of the shell body 731, the main body of the signal sensing and transmitting circuit 71, the shell cover 732 including the battery hole 733, the battery 72, the water-resistant ring 736, and the battery cover 734 are similar to that of the elements shown in FIG. 2(a) except the combination of the shell body 731 and the shell cover 732. They are integrated by an ultrasonic jointing method instead of screwing. Accordingly, the water-resistant ring between the shell body and the shell cover is saved. Furthermore, since the ultrasonic combination method consumes less time that of the screwing process, the assembling efficiency is increased. However, the main body of the signal sensing and transmitting circuit 71, especially the antenna, may be damaged by the vibration generated during the ultrasonic jointing process. As a result, the yield is reduced. Furthermore, the main body of the signal sensing and transmitting circuit 71 and the battery 72 must be respectively covered and fastened by the shell cover 732 and the battery 734. The assembling process is still troublesome.

It is then attempted by the Applicant to solve the above-mentioned problems.

SUMMARY OF THE INVENTION

An object of the present invention is to provide an easily-assembled shell structure for a signal sensing and transmitting device of a speedometer of a bicycle.

Another object of the present invention is to increase the yield and reduce the cost of manufacturing a shell structure for a signal sensing and transmitting device of a speedometer of a bicycle.

According to the present invention, a shell structure of a signal sensing and transmitting device adapted to be used with a wireless speedometer for a bicycle is provided. A main body of a signal sensing and transmitting circuit and a battery is received within the shell structure. The shell structure includes a shell body. The shell body includes an opening for being inserted therethrough the main body of the signal sensing and transmitting circuit and the battery. The shell body also includes a receiving space for receiving therein the main body of the signal sensing and transmitting circuit and the battery. The shell structure further includes a fastening lip for covering the opening of the shell body and fastening the main body of the signal sensing and transmitting circuit and the battery within the shell body.

The shell body is preferably pillared and hollow for forming therein the receiving space. Preferably, the opening is formed on a top portion of the shell body. More particularly, the fastening lip may be circular while the shell body is cylindrical. In such a situation, both the shell body and the fastening lip may be threaded for screwing the fastening lip on the shell body.

According to another aspect of the present invention, a flexible fixer is preferably formed on the shell body, and a recess corresponding to the flexible fixer is formed on the fastening lip for receiving therein the flexible fixer.

According to still another aspect of the present invention, the shell body and the fastening lip may be jointed by a bolt.

Preferably, a water-resistant ring is mounted between the fastening lip and the shell body for keeping the receiving space from moisture. Such a water-resistant ring can be made of rubber or silica gel.

Preferably, both the fastening lip and the shell body include threaded portions respectively so that the fastening lip can be screwed on the shell body. In such a situation, the water-resistant ring is mounted between the threaded portions.

According to another aspect of the present invention, the water-resistant ring can also be mounted around the rim of the opening or at the junction of the shell body and the fastening lip.

The main body of the signal receiving and transmitting circuit preferably includes a transmitting antenna, a print circuit board (PCB), and a PCB holder for holding the PCB.

A battery supporter is preferably mounted on the PCB holder for supporting the battery.

Preferably, the shell body further includes a fixing ring for fixing the signal sensing and transmitting device on a bicycle.

The shell body is preferably formed integrally.

The present invention may best be understood through the following description with reference to the accompanying drawings, in which:

DETAILED DESCRIPTION OF THE PREFERRED EMBODIMENTS

Figure 1:
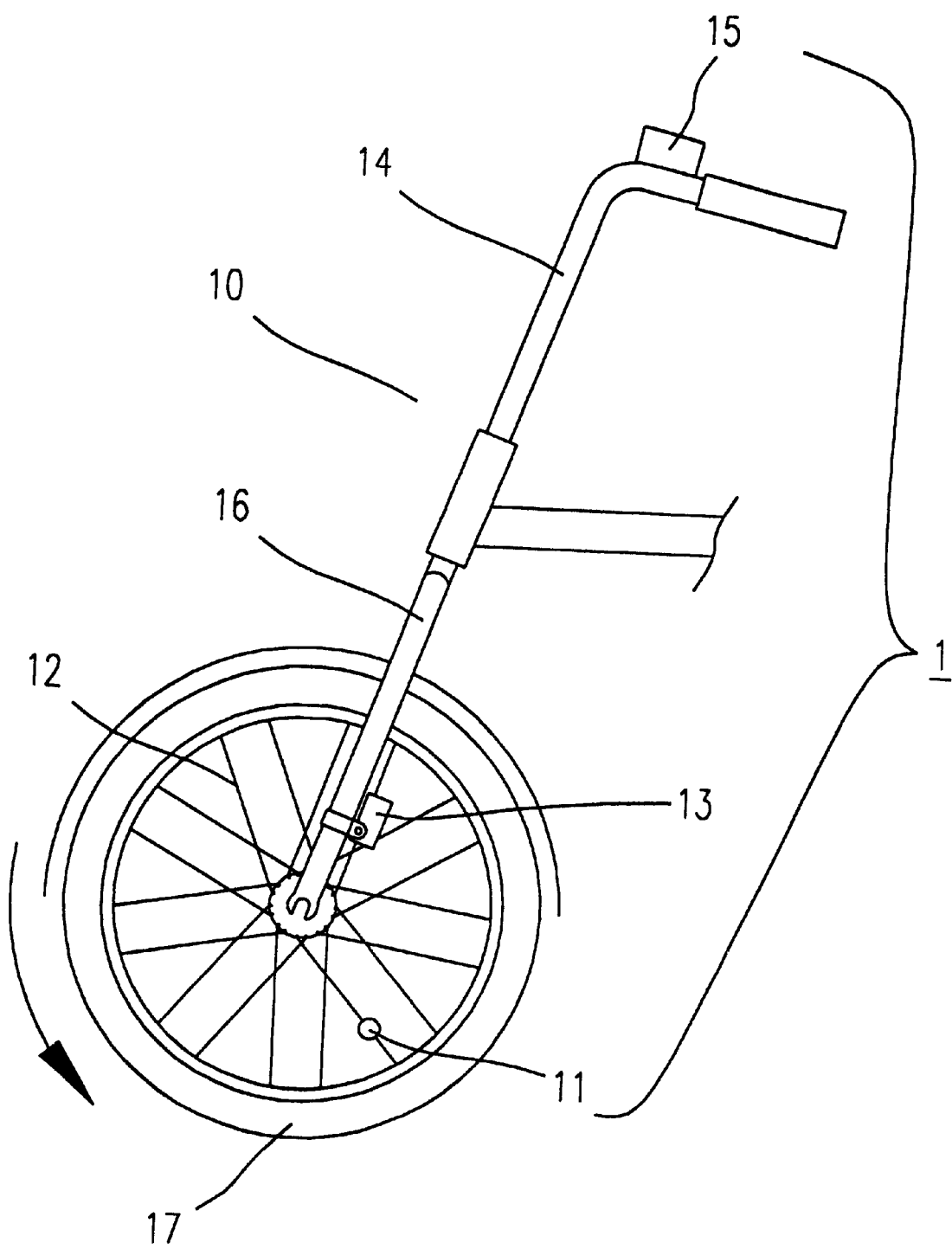
FIG. 1 illustrates a wireless speedometer mounted on a bicycle.
Figure 2A:
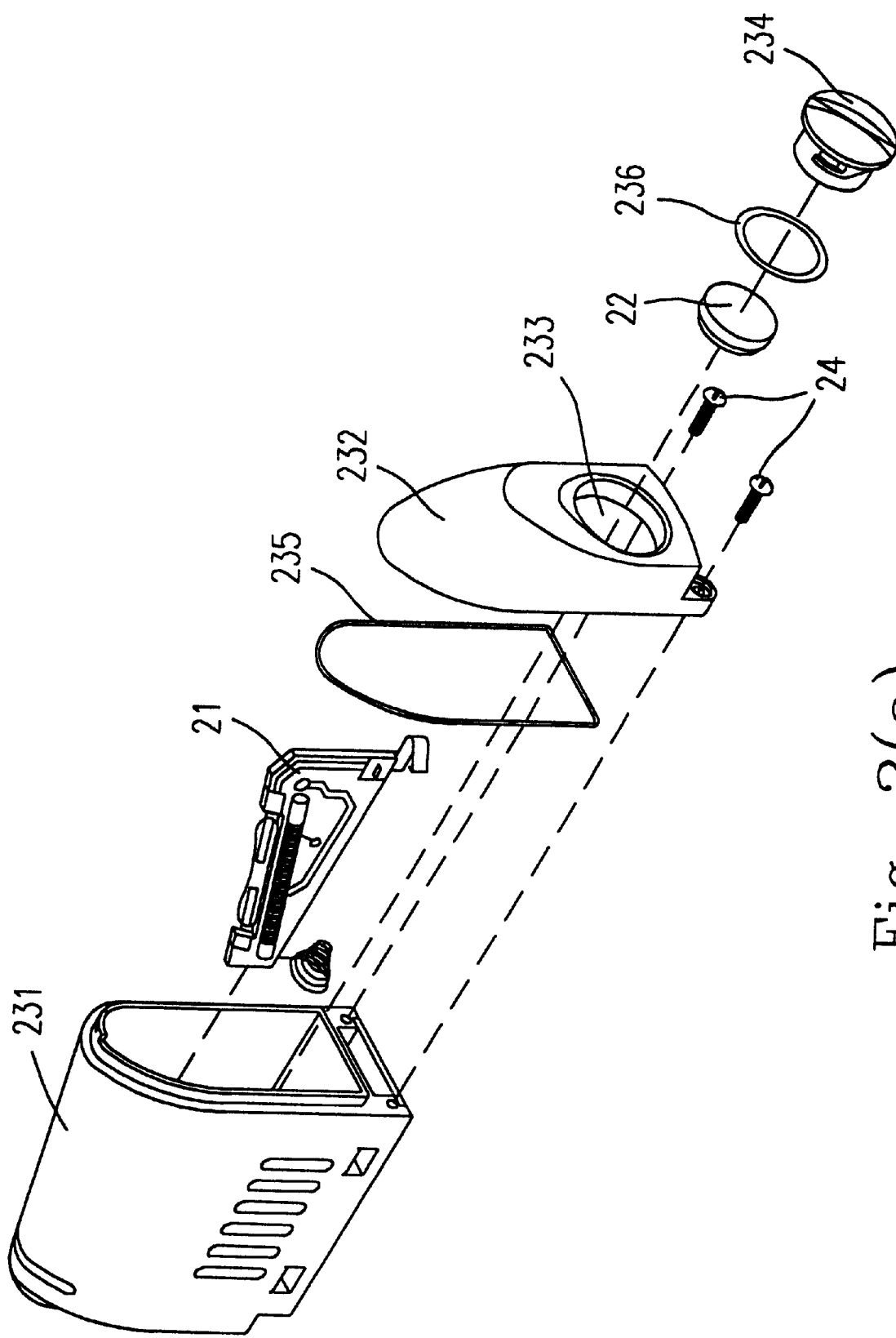
FIGS. 2(a) and 2(b) are explosive views of conventional signal sensing and transmitting devices.
Figure 2B:
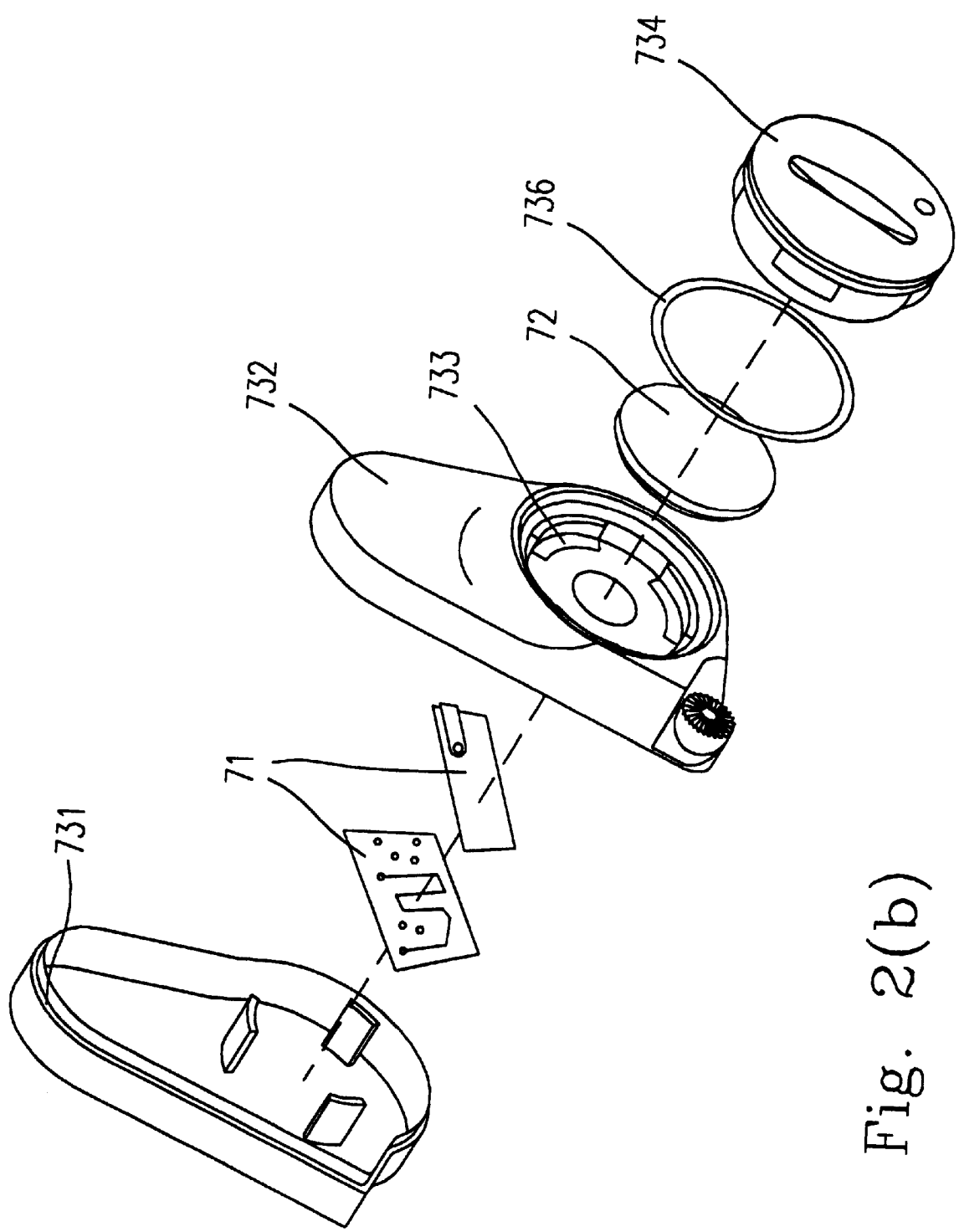
Figure 3A:
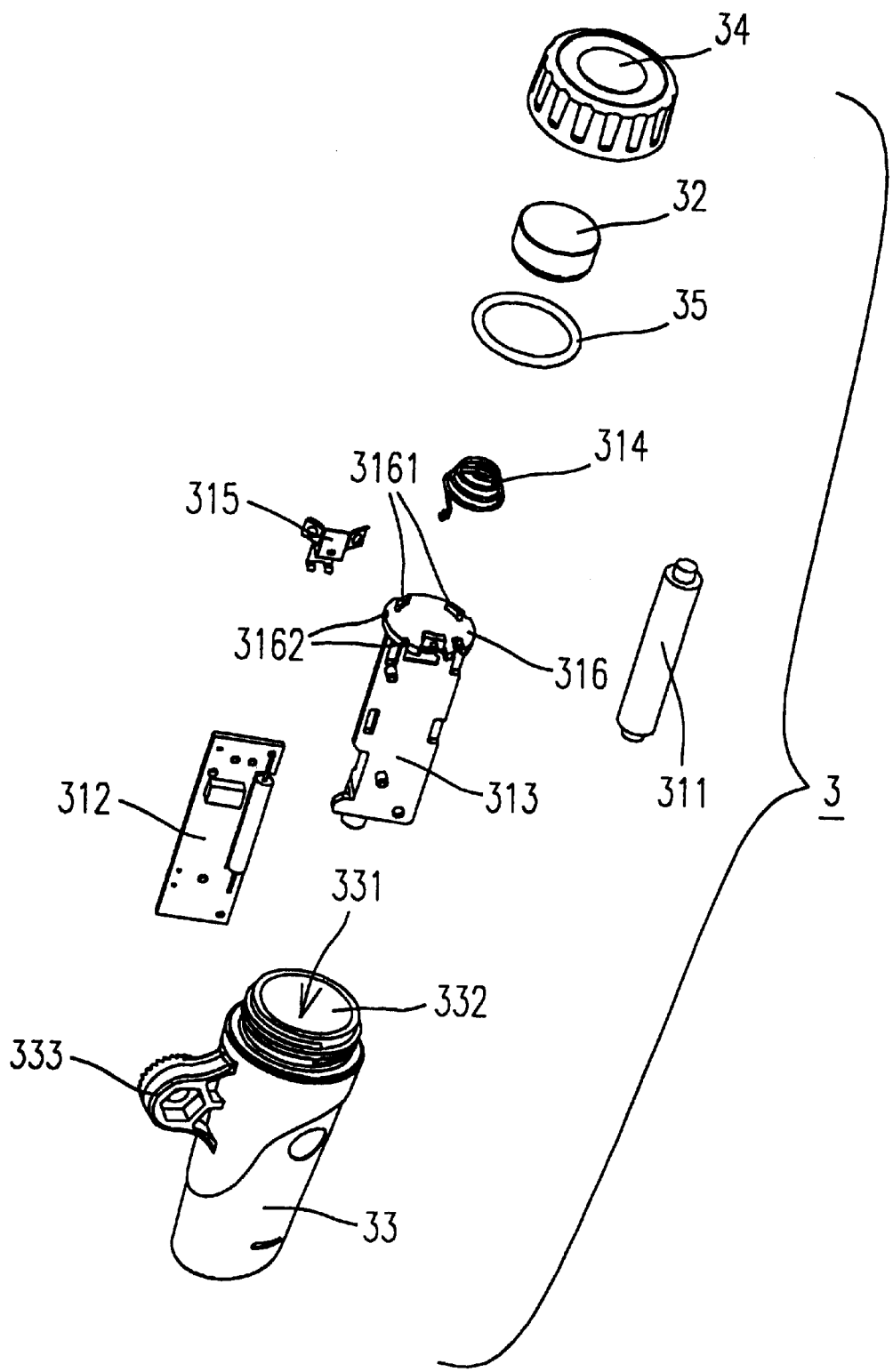
FIG. 3(a) is an explosive view of an embodiment of a signal sensing and transmitting device according to the present invention.
Figure 3B:
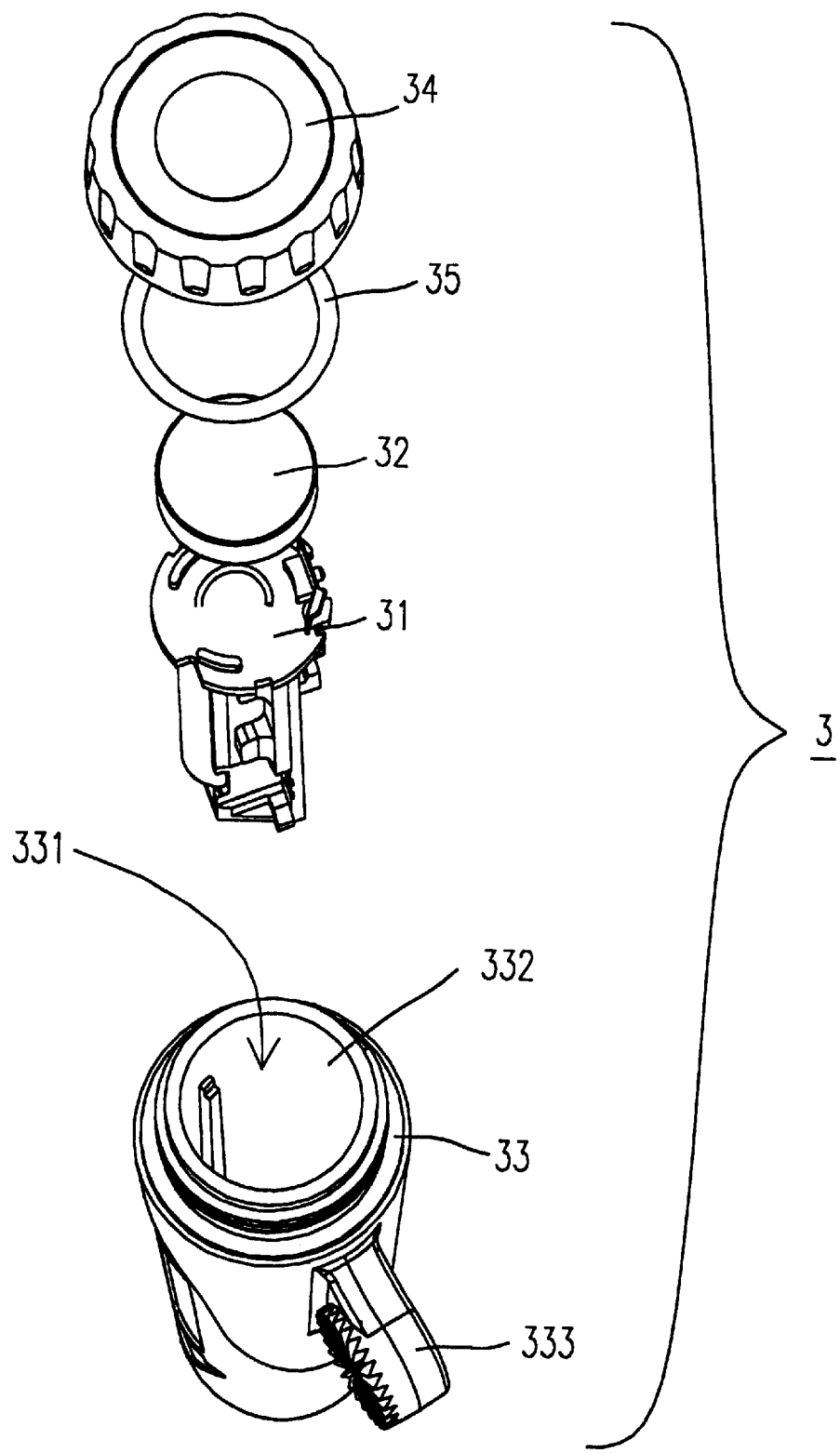
FIG. 3(b) is another explosive view of the signal sensing and transmitting device shown in FIG. 3(a).

FIG. 3(a) illustrates the structure of a preferred embodiment of the signal sensing and transmitting device according to the present invention. The signal sensing and transmitting device is used in a wireless speedometer 1 for a bicycle 10 as shown in FIG. 1. Referring to FIG. 3(b), the signal sensing and transmitting device 3 includes a shell 33, a main body of the signal receiving and transmitting circuit 31, a battery 32, a water-resistant ring 35, and a fastening lip or cover 34. Referring to FIG. 3(a), the main body of the signal receiving and transmitting circuit 31 is constructed of the transmitting antenna 311, the print circuit board (PCB) 312, the PCB holder 313 for holding the PCB 312, the electrode structure 314 and 315, and a battery supporter 316. The electrode 314 is a spring mounted on the raised structures 3161 of the battery supporter 316. The battery 32 is mounted between the electrode structure 314 and 315 for supplying electric power to the PCB 312. The battery 32 is supported by the electrode 314. The battery supporter 316 includes two indents 3162 for being mounted thereon the electrode 315.

In the present invention, the shell structure of the signal sensing and transmitting device is improved. The shell body 33 is hollow and pillared. The pillared shell body 33 is substantially cylindrical. It may be formed integrally. A fastening ring 333 is formed on the shell body 33 to fasten it on a fork of a bicycle (such as the fork 16 shown in FIG. 1). The receiving space 331 formed within the follow shell body 33 is used for receiving therein the main body of the signal receiving and transmitting circuit 31 and the battery 32. The main body of the signal receiving and transmitting circuit 31 and the battery 32 are placed into the receiving space 331 through the opening 332 formed on the top portion of the cylindrical-shaped shell body 33. The fastening lip or cover 34 is circular and threaded. The shell body 33 is also threaded around the portion near the opening 332 so that the fastening lip or cover 34 can be screwed on the opening 332. When the main body of the signal receiving and transmitting circuit 31 and the battery 32 have been inserted into the receiving space 331, the fastening lip 34 is screwed on the shell body 33. Accordingly, the opening 332 is covered, and the main body of the signal receiving and transmitting circuit 31 and the battery 32 are fixed.

The water-resistant ring 35 is made of rubber or silica gel. It is mounted between the threaded portions of the fastening lip or cover 34 and the shell body 33 so that the receiving space 331 is kept away from moisture.

From the above-mentioned embodiment, it is known that the shell body 33 is used for replacing the conventional structures. The opening 332 is used for being inserted therethrough not only the main body of the signal receiving and transmitting circuit 31, but also the battery 32. Accordingly, referring to FIGS. 4(a) and 4(b), when assembling the signal sensing and transmitting device 3, only two simple steps has to be finished. Firstly, the main body of the signal receiving and transmitting circuit 31 and the battery 32 are inserted into the shell body 33. Then, the fastening lip 34, together with the water-resistant ring 35, is screwed on the shell body 33. Since both the main body of the signal receiving and transmitting circuit 31 and the battery 32 are fixed by only one element, i.e. the fastening lip 34, the assembling time is shorten. Furthermore, since the main body of the signal receiving and transmitting circuit 31 is fixed when the fastening lip 34 and the shell body 33 are assembled, the supersonic process that might harmful to the main body of the signal receiving and transmitting circuit 31 is avoided.

Figure 4A:
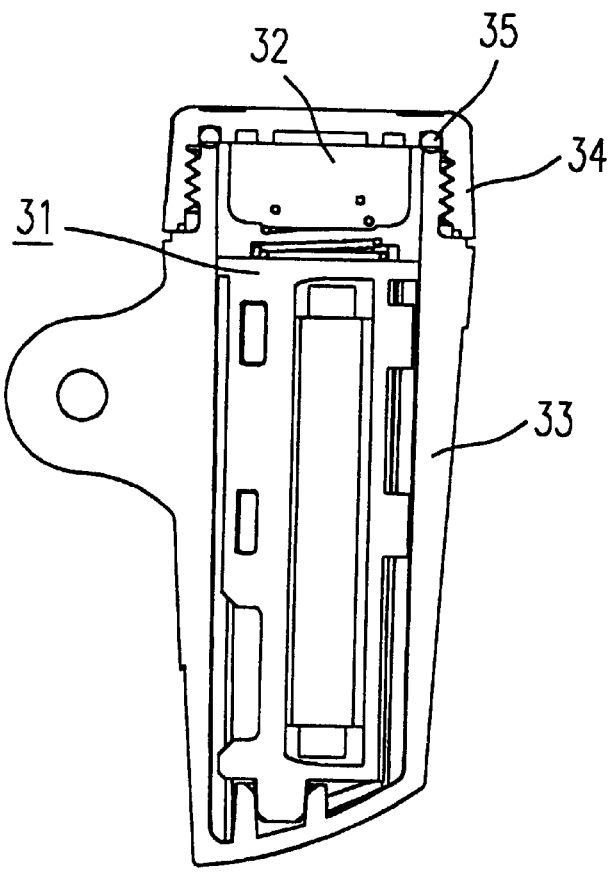
FIG. 4(a) is a cross sectional view of the signal sensing and transmitting device shown in FIG. 3(a), taken along line 4(a)—4(a) of FIG. 4(b)
Figure 4B:
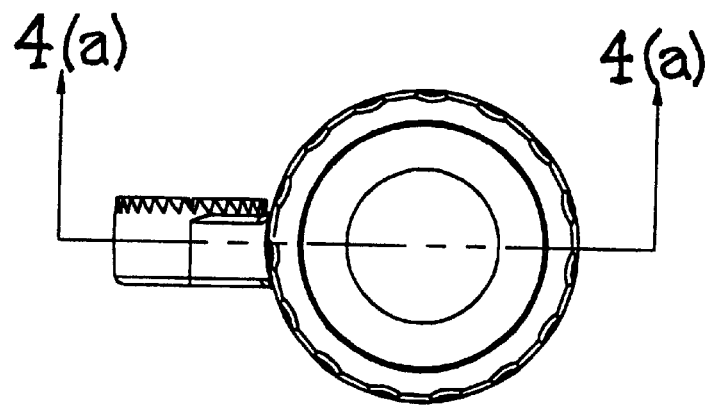
FIG. 4(b) is a top view of the assembled signal sensing and transmitting device shown in FIG. 3(a)
Figure 5A:
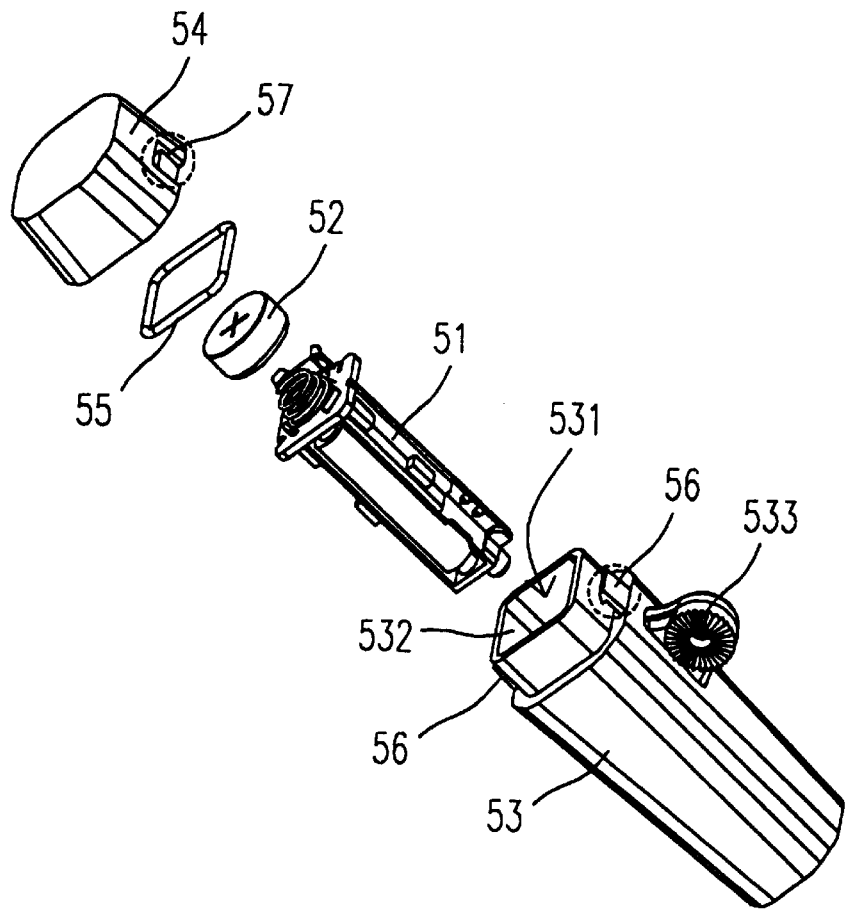
FIG. 5(a) is an explosive view of another embodiment of a signal sensing and transmitting device according to the present invention.
Figure 5B:
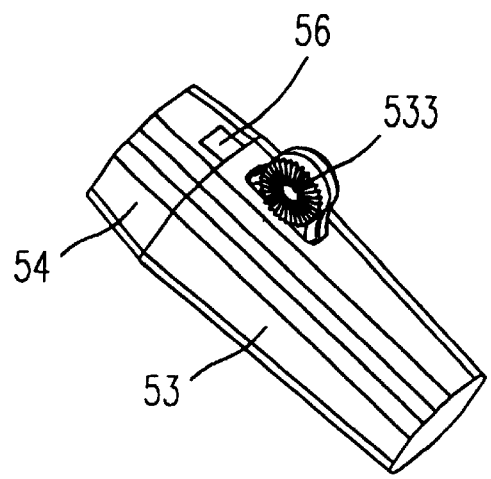
FIG. 5(b) illustrates the assembled signal sensing and transmitting device shown in FIG. 5(a)
Figure 6A:
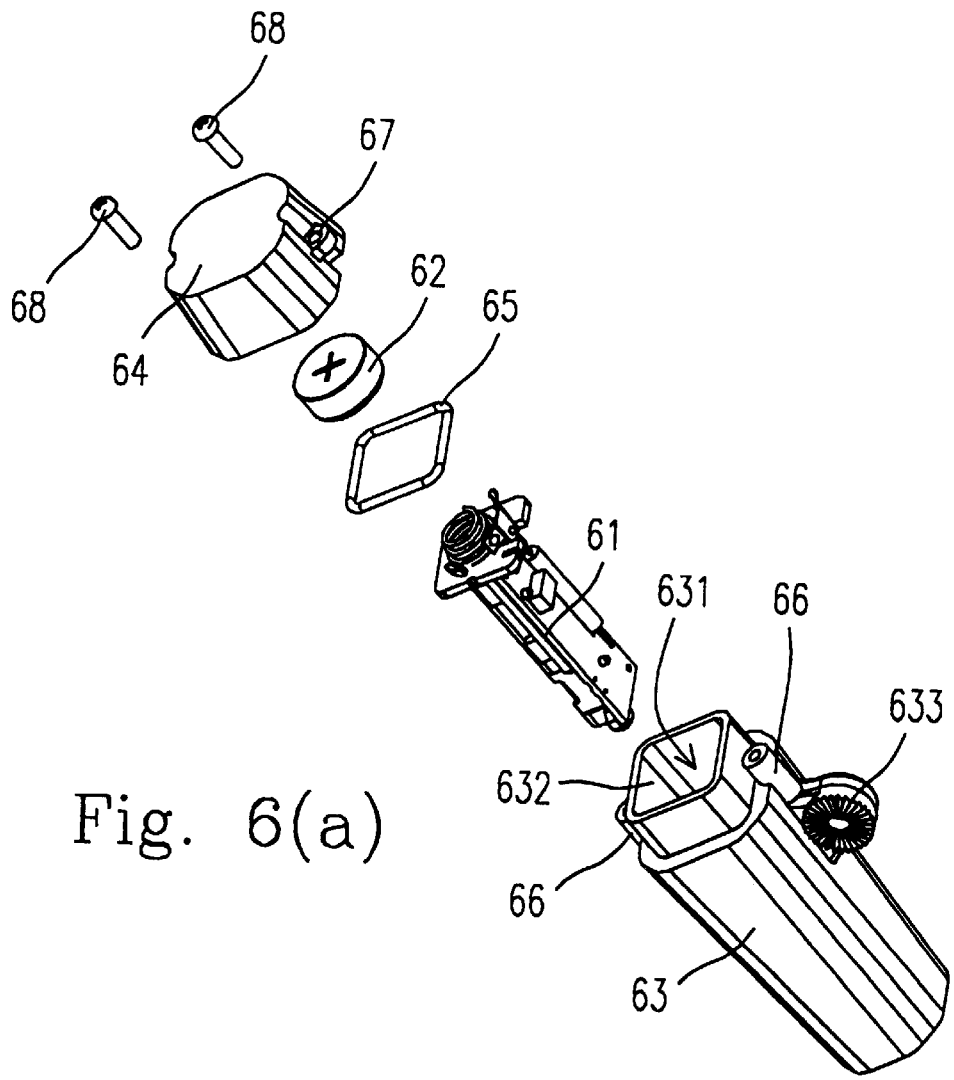
FIG. 6(a) is an explosive view of still another embodiment of a signal sensing and transmitting device according to the present invention.
Figure 6B:
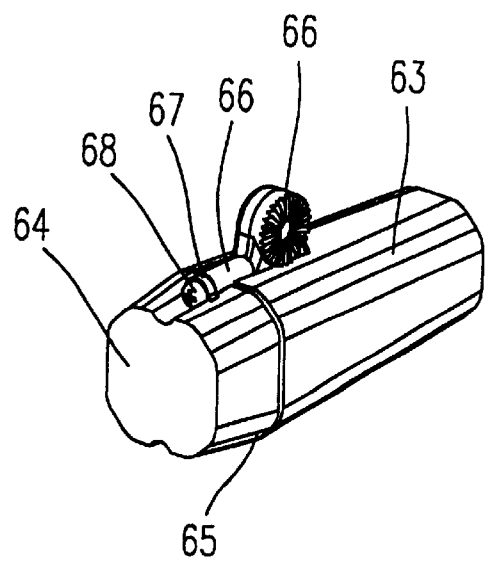
FIG. 6(b) illustrates the assembled signal sensing and transmitting device shown in FIG. 6(a).

Of course, the fastening lip 34 and the shell body 33 can be combined by not only the threads. The flexible fixers 56 and the corresponding recesses 57 as shown in FIGS. 5(a) and 5(b) are also available. The flexible fixers 56 include hooked top portions for being received by the corresponding recesses 57. In another embodiment, the bolts 68, through holes 67 and the threaded bases 66 illustrated in FIGS. 6(a) and 6(b) are used for fixing the lip 64 on the top portion of the shell body 63. Furthermore, as shown in FIGS. 5(a) to 6(b), the cross sections of the shell body and the lip are not necessarily circular. Rectangle or other shapes are also available. The water-resistant ring 55 shown in FIG. 5(a) is mounted around the rim of the opening 531 instead of the threaded portions as shown in FIGS. 4(a) and 4(b). The other water-resistant ring 65, as shown in FIGS. 6(a) and 6(b), is mounted at the junction of the fastening lip 64 and the shell body 63.

While the invention has been described in terms in what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A shell structure of a signal sensing and transmitting device adapted to be used with a wireless speedometer for a bicycle, wherein a main body of a signal sensing and transmitting circuit and a battery are received within said shell structure, comprising:

a shell body formed into a pillared shape including an opening on a top portion thereof for inserting therethrough said main body of said signal sensing and transmitting circuit and said battery and a receiving space for receiving therein said main body of said signal sensing and transmitting circuit and said battery; and a fastening cover for covering said opening of said shell body and fastening said main body of said signal sensing and transmitting circuit and said battery within said shell body.

2. A shell structure according to claim 1, wherein said shell body is hollow for forming therein said receiving space.

3. A shell structure according to claim 2, wherein said shell body is cylindrical and said fastening cover is circular.

4. A shell structure according to claim 3 wherein both said shell body and said fastening lip are threaded so that said fastening lip can be screwed on said shell body.

5. A shell structure according to claim 1 wherein a flexible fixer is formed on said shell body, and a recess corresponding to said flexible fixer is formed on said fastening lip for receiving therein said flexible fixer.

6. A shell structure according to claim 1 wherein said shell body and said fastening lip are jointed by a bolt.

7. A shell structure according to claim 1, further comprising a water-resistant ring mounted between said fastening lip and said shell body for keeping said receiving space away from moisture.

8. A shell structure according to claim 7 wherein said water-resistant ring is made of a material selected from one of rubber and silica gel.

9. A shell structure according to claim 7 wherein both said fastening lip and said shell body include threaded portions respectively so that said fastening lip can be screwed on said shell body, and said water-resistant ring is mounted between said threaded portions.

10. A shell structure according to claim 7 wherein said water-resistant ring is mounted around a rim of said opening.

11. A shell structure according to claim 7 wherein said water-resistant ring is mounted at a junction of said shell body and said fastening lip.

12. A shell structure according to claim 1 wherein said main body of said signal receiving and transmitting circuit includes a transmitting antenna, a print circuit board (PCB), and a PCB holder for holding said PCB.

13. A shell structure according to claim 12 wherein a battery supporter is mounted on said PCB holder for supporting said battery.

14. A shell structure according to claim 1 wherein said shell body further includes a fixing ring for fixing said signal sensing and transmitting device on a bicycle.

15. A shell structure according to claim 1 wherein said shell body is formed integrally.

* * * * *